United States Patent
Iotti

(10) Patent No.: US 12,416,317 B2
(45) Date of Patent: Sep. 16, 2025

(54) METHOD FOR CONTROLLING THE ROTATION SPEED OF A MOTOR

(71) Applicant: MANITOU ITALIA S.R.L., Castelfranco Emilia (IT)

(72) Inventor: Marco Iotti, Reggio Emilia (IT)

(73) Assignee: MANITOU ITALIA S.R.L., Castelfranco Emilia (IT)

( * ) Notice: Subject to any disclaimer, the term of this patent is extended or adjusted under 35 U.S.C. 154(b) by 0 days.

(21) Appl. No.: 18/779,367

(22) Filed: Jul. 22, 2024

(65) Prior Publication Data

US 2025/0043805 A1 Feb. 6, 2025

(30) Foreign Application Priority Data

Aug. 2, 2023 (IT) .................. 102023000016377

(51) Int. Cl.
*F15B 13/06* (2006.01)
*F15B 11/04* (2006.01)
(Continued)

(52) U.S. Cl.
CPC .............. *F15B 13/06* (2013.01); *F15B 11/04* (2013.01); *F15B 11/16* (2013.01); *F15B 11/165* (2013.01);
(Continued)

(58) Field of Classification Search
CPC .......... F15B 13/06; F15B 11/04; F15B 11/16; F15B 11/161; F15B 11/162; F15B 11/165;
(Continued)

(56) References Cited

U.S. PATENT DOCUMENTS 4,712,376 A 12/1987 Hadank et al.
10,563,377 B2 * 2/2020 Kishida ................. E02F 9/2235
(Continued)

FOREIGN PATENT DOCUMENTS

DE 102020204254 A1 10/2021
EP 4187027 A1 5/2023
IT 202100030143 A1 * 5/2023 ............ E02F 9/2228

OTHER PUBLICATIONS

Italian Search Report and Written Opinion from Italian Patent Application No. 102023000016377, Date of Completion of Search Report: Jan. 25, 2024, 11 pages.

*Primary Examiner* — Loren C Edwards
(74) *Attorney, Agent, or Firm* — Chrisman Gallo Tochtrop LLC

(57) ABSTRACT

A method for controlling the rotation speed of a motor that includes the steps of preparing a first function which puts in relation the flow rate delivered by a pump with the pump rotation speed, preparing a second function which puts in relation a flow rate delivered by a flow rate control valve with a level of the control signal received, detecting the presence of control signals and the level of each control signal, using the second function, calculating the flow rate delivered by each flow rate control valve as a function of the level of the control signal received, calculating a total required flow rate, as the sum of the flow rates delivered by each flow rate control valve, using the first function, calculating a required rotation speed of the pump and adjusting the speed of rotation of the motor.

9 Claims, 2 Drawing Sheets

(51) Int. Cl.
*F15B 11/16* (2006.01)
*H02P 23/00* (2016.01)
(52) U.S. Cl.
CPC ......... *H02P 23/0004* (2013.01); *F15B 11/162* (2013.01); *F15B 2211/3059* (2013.01); *F15B 2211/3144* (2013.01); *F15B 2211/327* (2013.01); *F15B 2211/6346* (2013.01); *F15B 2211/6651* (2013.01); *F15B 2211/71* (2013.01)
(58) Field of Classification Search
CPC ...... F15B 2211/3059; F15B 2211/3144; F15B 2211/327; F15B 2211/6303; F15B 2211/6346; F15B 2211/6651; F15B 2211/71; H02P 23/0004; F04B 49/20; F04D 15/0066; F04D 27/004; B66F 9/22; E02F 9/2246
See application file for complete search history.

(56) References Cited

U.S. PATENT DOCUMENTS

| | | |
|---|---|---|
| 11,009,048 B1 | 5/2021 | Neumann et al. |
| 11,566,400 B2 | 1/2023 | Schwall |
| 2006/0090459 A1 | 5/2006 | Devier et al. |
| 2014/0130487 A1* | 5/2014 | Akiyama ............... E02F 9/2285 60/431 |
| 2022/0275605 A1* | 9/2022 | Nakajima ............. E02F 9/2285 |

\* cited by examiner

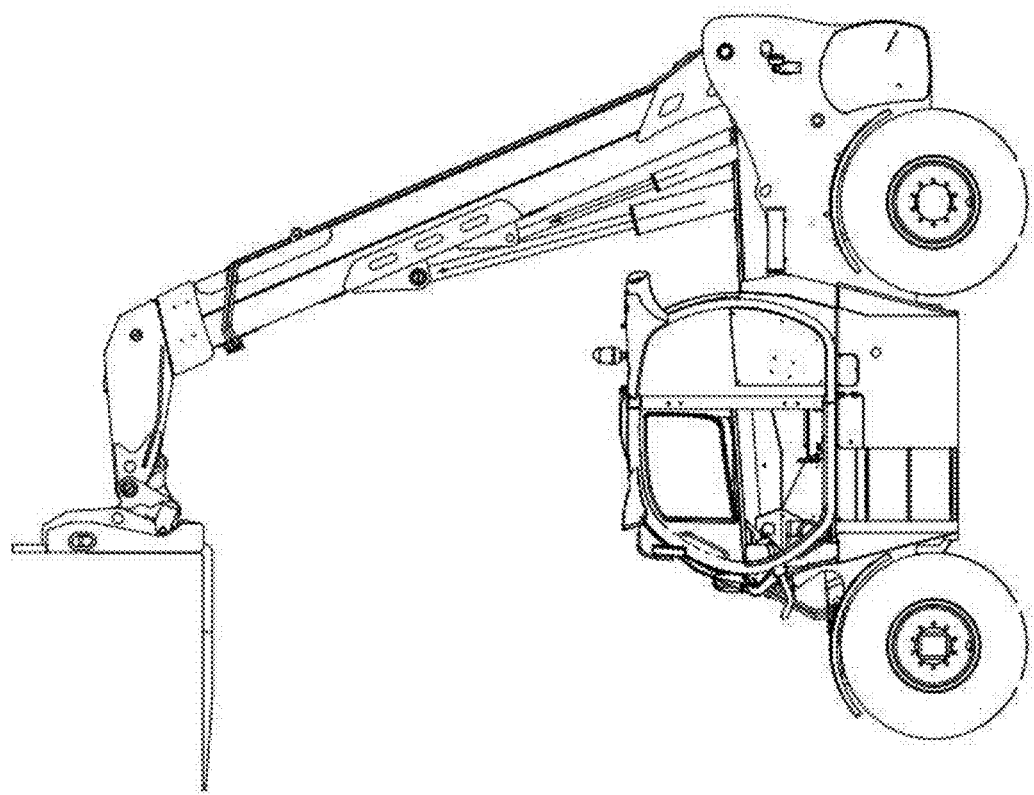

METHOD FOR CONTROLLING THE ROTATION SPEED OF A MOTOR

This invention relates to a method for controlling the rotation speed of a motor.

The term "rotation speed" refers to the number of revolutions per minute performed by the motor.

The motor may be an electric motor or an internal combustion engine.

More in detail, the invention relates especially, even if not exclusively, to a telescopic handler.

There are prior art telescopic handlers consisting of a vehicle provided with a frame, or "carriage," movable on wheels, of a driver's cab which houses the operator and an operating arm which can be extended for lifting and lowering a load.

In some models, the operating arm is hinged directly to the carriage, whilst other models are provided with a platform, or "turret", mounted rotatably on the carriage, which has the cab and to which the operating arm is hinged.

An apparatus is attached at the distal end of the arm for lifting or moving loads, such as, for example, a fork, a cage, a winch, etc. An example of an operator vehicle on which the method according to this invention can be adopted is shown schematically in FIG. 2.

The hydraulic actuators are supplied by means of a control circuit comprising valves and distributors which direct the operator fluid to the various actuators, as a function of specific activation commands which may be automatic or imparted by an operator by means of suitable control elements.

The control circuit of the hydraulic actuators is connected to a pump which, in turn, is driven by the engine of the vehicle. Besides the operation of the pump, the latter may also be designed to produce the driving force of the vehicle, using a transmission system known in the trade.

Currently, the motor revolution speed is not subject to any particular control methods. In general, as a function of the operating conditions of the vehicle, the motor is maintained at a steady state which is sufficient to guarantee to the pump the delivery of the flow rate necessary for supplying, with a maximum flow rate, all the actuators present on the vehicle. In such conditions, except in the rare cases in which the maximum flow rate to the pump is required, most of the flow rate delivered by the pump is recirculated to the tank, without being used for producing a useful work. This results in substantially unnecessary energy consumption.

The main aim of this invention is to provide a method which allows a reduction of the energy consumption of the motor, whilst guaranteeing the functionality of the actuators served by the pump.

Further features and advantages of the invention are more apparent from the detailed description which follows of an embodiment of the invention, illustrated by way of a non-limiting example in the accompanying drawings in which:

FIG. 2 shows a schematic view of a vehicle on which the method according to this invention can be adopted.

Figure 1:
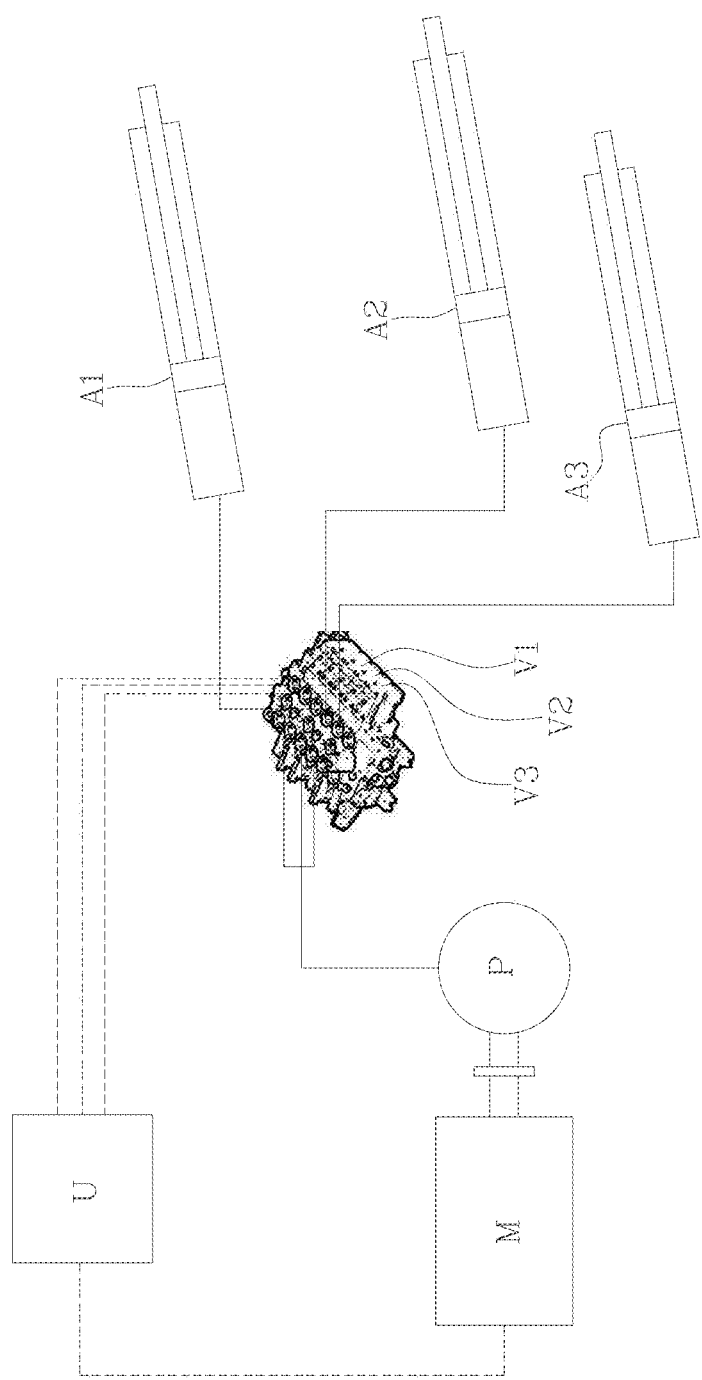
FIG. 1 shows a schematic view representing a system comprising some components on which the method according to this invention is operating.

The method for controlling the rotation speed of a motor according to this invention is particularly effective for controlling the rotation speed of a motor associated with an operator vehicle provided with one or more hydraulic actuators for actuating movable parts of the vehicle and/or tools, such as, for example, one or more lifting arms, a system of stabilisers, a system for rotating a turret or the like. These movable parts and tools are known in the trade and will not be described in detail.

The hydraulic actuators are supplied by means of a control circuit comprising valves and distributors which direct the operator fluid to the various actuators, as a function of specific activation commands which may be automatic or imparted by an operator by means of suitable control elements.

In the description which follows, the term "valve" means a valve of the distributor type, that is to say, a flow rate control valve, with direct electrical, electro-hydraulic, electro-mechanical control or other control, designed for adjusting the flow of a fluid along a conduit. Even if it is not explicitly stated, it will be understood that a valve comprises at least one shutter, movable in a seat between a closed position, in which it prevents the flow through the valve and, therefore, along the conduit in which the valve is installed, and at least one open position, in which it allows the flow through the valve and, therefore, along the conduit in which the valve is installed.

Indicating an open position or configuration of a valve means one of the configurations wherein the shutter is in the open position.

Indicating a closed position or configuration of a valve means a configuration wherein the shutter is in the closed position.

Indicating an opening command means an action which causes the movement of the shutter towards the open position.

Indicating a closing command means an action which causes the movement of the shutter towards the closed position.

The expression "valve with electro-mechanical actuation" means a valve provided with an electro-mechanical actuator which acts on the shutter or on a control element which determines the movement of the shutter for moving it towards the open or closed position. An elastic means acts in opposition to the electro-mechanical actuator to move the shutter in the opposite direction, in the absence of the action exerted by the electro-mechanical actuator.

The control circuit of the hydraulic actuators is connected to a pump which, in turn, is driven by the engine of the vehicle. Besides the operation of the pump, the latter may also be designed to produce the driving force of the vehicle, using a transmission system known in the trade.

The method according to this invention is particularly effective if used for controlling the rotation speed of an electric motor. However, the method according to this invention is suitable for controlling the rotation speed of an internal combustion engine.

Hereinafter in this description reference is made to a system comprising motor (M) connected to a pump (P). The latter is, in turn, connected to one or more hydraulic actuators (A1, A2, A3 . . . ), designed for actuating movable parts and/or operator tools.

Between the pump (P) and each actuator at least one flow rate control valve (V1, V2, V3 . . . ) is interposed, with electrical activation. Each flow rate control valve is designed for delivering a flow rate of operator fluid proportional to the level of a control signal.

Preferably, but not necessarily, the control signals for the control valves are electrical signals, and the level of each control signal is the intensity of an electric current.

The control valves are known in the sector. Typically, the control valves comprise a shutter or coil, movable in a sealed fashion inside a seat made inside a valve body. The shutter is movable between at least a closed position, in which it prevents the flow of the operator fluid, and at least a fully open position, in which it allows the flow of operator fluid. The shutter may also adopt any intermediate position between the fully open and closed positions. In the maximum open position of the shutter, the valve allows the flow of a maximum flow rate of operator fluid. In the intermediate positions of the shutter, the flow rate which can be transmitted by the valve is reduced, as a function of the actual position adopted by the operator.

The shutter is movable between the closed position and the open position by means of an electromechanical actuator, such as, for example, a solenoid. The position actually adopted by the shutter depends on the intensity of the current supplied to the electro-mechanical actuator which acts on the shutter.

As is known in the trade, varying the flow rate supplied to a hydraulic actuator causes a variation in the speed of movement of the actuator: the greater the flow rate supplied to the actuator the greater is the speed of movement of the actuator.

Preferably, the level of each control signal can be adjusted by means of a control device, which can be operated by an operator. This allows the flow rate which can be delivered by each flow rate control valve (V1, V2, V3 . . . ) to be adjusted and, consequently, to adjust the flow rate of operator fluid sent to each actuator, in such a way as to adjust the speed of movement. In other words, in a manner known in the sector, the level of each control signal to each flow rate control valve (V1, V2, V3 . . . ) is adjustable by means of a control device, such as, for example, a joystick or other equivalent means, which can be operated by an operator. By actuating the control device, that is to say, by positioning the control device in a selected operating position, it is possible to adjust the speed of movement of the actuator (A1, A2, A3 . . . ) connected to the flow rate control valve (V1, V2, V3 . . . ) on which the control device acts.

According to a possible embodiment, the joystick is of the electrical type and is designed for sending input signals to a control module (U). For example, the electric joystick is connected via Can Bus to the control module (U) which is able to process the input signal coming from the joystick itself.

The method according to this invention comprises preparing a first and a second function. The term "function" means a mathematical relationship which allows two variable quantities to be matched in a biunique fashion. In particular, by using each function it is possible to know the value of one of the two known variable quantities knowing the value from the other variable quantity.

In known manner, each function is structured so that it can be processed by an electronic processor, in such a way that, by receiving as input the value of one of the two variable quantities, the processor can provide as output the corresponding value of the other variable quantity.

The method according to the invention comprises a step of preparing a first function which puts in relation the flow rate which can be delivered by the pump with the speed of rotation of the pump. In other words, the first function allows the number of revolutions performed by the pump in the unit of time to be put in relation with the flow rate which can be delivered by the pump at that number of revolutions.

Preferably, the first function is obtained experimentally, by measuring the actual flow rate which can be delivered by the pump at one or more predetermined pressure values at the delivery and one or more predetermined rotation speeds, and performing an interpolation, using a predetermined mathematical method, of the actual flow rates measured. Alternatively, in the case of a volumetric pump, the first function is obtained from the displacement of the pump, calculating the flow rate which can be delivered at a certain rotation speed as a multiplication of the displacement for the number of revolutions per unit time at that rotation speed.

In general, the first function is defined as any relation between the flow rate which can be delivered by the pump and the rotation speed of the pump. In particular, the first function is any function which, given a certain flow rate requested from the pump, provides the rotation speed to obtain the delivering of the requested flow rate, or, vice versa, given a certain rotation speed of the pump, provides the flow rate which can be delivered by the pump at that rotation speed.

The method according to the invention also comprises preparing, for each flow rate control valve, preparing a second function which puts in relation a flow rate which can be delivered by the flow rate control valve with a level of the control signal received.

According to the preferred embodiment of the method, wherein the flow rate control valves are direct electrical, electro-hydraulic, electro-mechanical or other control valves, each second function allows the intensity of the current sent to the respective control valve flow to be put in relation with the flow rate which can be delivered by the valve at that current intensity. That is because, as already explained, a predetermined current intensity corresponds to a predetermined position of the shutter of the flow rate control valve, corresponding to a predetermined flow rate which can be delivered.

The method according to this invention, at a predetermined instant, comprises performing the following steps:
  detecting the presence of one or more control signals and the level of each control signal;
  using the second function, calculating the flow rate which can be delivered by each flow rate control valve as a function of the level of the control signal received;
  calculating a total required flow rate, as the sum of the flow rates which can be delivered by each flow rate control valve;
  using the first function, calculating a required rotation speed of the pump;
  adjusting the speed of rotation of the motor as a function of the required speed of rotation of the pump.

In other words, considering a predetermined instant of time, the method comprises detecting the presence of one or more control signals, that is to say, detecting whether an operator is requesting the activation of one or more actuators (A1, A2, A3 . . . ), acting on a suitable control device. In the presence of one or more control signals, the method comprises detecting the level of each control signal, that is to say, according to the preferred embodiment of the method, detecting the intensity of the current sent to each flow rate control valve (V1, V2, V3 . . . ).

Subsequently, using the second function, the method comprises calculating the flow rate which can be delivered by each flow rate control valve as a function of the level of the control signal received. This is possible because, for the reasons already explained, the intensity of the current sent to each flow rate control valve results in the positioning of the respective shutter in a predetermined position, and a corresponding flow rate which can be delivered by the valve.

Once the flow rates which can be delivered by each flow rate control valve have been acquired, the method comprises calculating a total required flow rate, as the sum of the flow rates which can be delivered by each flow rate control valve at the instant of time considered.

Knowing the total flow rate requested, the method comprises, by means of the first function, calculating a required rotation speed of the pump. This required rotation speed allows the requested flow rate to be delivered at the instant considered. Preferably, but not necessarily, the required rotation speed is the minimum necessary to deliver the total required flow rate.

Lastly, the method comprises adjusting the speed of rotation of the motor as a function of the required speed of rotation of the pump.

The method according to this invention therefore allows the motor rotation speed to be adapted to the actual flow rate requirements of each flow rate control valve, as a function of the commands given by the operator. In particular, the method allows the motor revolution speed to be adjusted to the minimum required to allow the total flow rate requested to be delivered to the pump. This makes it possible to optimise the energy consumption of the motor, avoiding rotation speeds higher than that sufficient to obtain the flow rate required to the pump to be delivered.

The optimisation of energy consumption can be achieved both in the presence of an electric motor and in the presence of an internal combustion engine. In the first case, rotation speed adjustment is performed in known manner by means of the electronic circuit for powering the motor. In the second case, the adjustment of the rotation speed is performed by acting, in known manner, on the system for feeding fuel to the engine.

Preferably, but not necessarily, the step of preparing the second function comprises, for each flow rate control valve, an experimental measurement of the flow rate which can be delivered at predetermined open positions, and an interpolation, using a predetermined mathematical method, of the flow rate which can be delivered in the predetermined open positions.

According to a possible embodiment, the method according to this invention comprises a step of assigning to each flow rate control valve a priority index and, if the total flow rate requested is greater than the flow rate which can be delivered by the pump, modifying the level of the control signal of the control valve as a function of the respective priority index, to reduce the flow rate which can be delivered of one or more control valves.

In other words, it is possible to establish a hierarchy of importance of the actuators (A1, A2, A3 . . . ), and, correspondingly, of the commands issued by the operator. For example, it is possible to distinguish between actuators to which the requested flow rate must always be guaranteed, and actuators to which the requested flow rate is allowed to be reduced or cancelled at times when the total required flow rate to the pump exceeds the maximum flow rate which can be delivered. This distinction may be obtained by attributing, to each flow rate control valve, a priority index.

The method comprises, in the presence of several control signals, checking if the total flow rate required is greater than the maximum flow rate which can be delivered by the pump. In that case, the method comprises not modifying the level of the control signal of the control valves which have a priority index of a predetermined value, that is to say, the valves associated with the actuators for which the operation must always be guaranteed at the maximum possible speed, and reducing or annulling the level of the control signal of the control valves which have a priority index of which the value is different from the previous one, that is to say, the control valves associated with the actuators for which it is not necessary to guarantee the operation in any condition.

According to a particularly advantageous embodiment, the method according to the invention comprises detecting one or more of the following operating conditions: presence of an operator on board; use of one or more commands for the actuators; state of travel or stopping of the vehicle. These operating conditions can be detected by sensors of the type known in the sector.

The method comprises, in the presence of at least one of the operating conditions, increasing the speed of rotation of the motor (M). The increase in the rotation speed allows the response times to be reduced at a command of all the actuators (A1, A2, A3 . . . ) present, but only in the presence of one or more of the operating conditions mentioned above. In the absence of said operating conditions, the motor rotation speed can be kept at a predetermined minimum value, making it possible to reduce the energy consumption.

The method according to this invention can be actuated by a control module (U).

According to a manner known in the sector, the control module (U) mentioned in this description and in the subsequent claims is indicated generically as a single unit, but in effect it may be equipped with separate functional modules (memory modules or operating modules), each designed for controlling a predetermined device or cycle of operations.

In short, the control module (U) may consist of a single electronic device, programmed to perform the functions described, and the various functional modules can correspond to hardware units and/or software routines forming part of the programmed device.

Alternatively or in addition, the functions can be performed by a plurality of electronic devices on which the above-mentioned functional modules can be distributed.

The processing units may also have one or more processors for the execution of the instructions contained in the memory modules. The units and the above-mentioned functional modules may also be distributed on different computes, either locally or remotely, on the basis of the architecture of the network on which they are housed.

The control module (U) is provided with a control algorithm configured for actuating the steps of the method according to the invention. Moreover, the control module (U) is connected to the control valves and is designed for adjusting the level of each control signal, as a function of the actions required of each actuator (A1, A2, A3 . . . ). In particular, the control module (U) is connected to the control devices available for the operator and, as a function of the commands issued by the operator, is set up for adjusting the level of each control signal, in accordance with the steps provided by the method according to this invention.

The control module (U) is also connected to one or more sensors, known in the sector, for detecting the above-mentioned operating conditions: presence of an operator on board; use of one or more commands for the actuators; state of travel or stopping of the vehicle. Moreover, the control module (U) is connected to the motor (M) and is designed for adjusting the rotation speed, in a manner known in the sector.

The invention claimed is:

1. A method for controlling a rotation speed of a motor, wherein: the motor is connected to a pump, the pump is connected to one or more hydraulic actuators;
an electrically activated flow rate control valve is interposed between the pump and each of the one or more hydraulic actuators, each of the flow rate control valves is configured for delivering a flow rate proportional to a level of a respective control signal;

the method comprises the following steps:

preparing a first function, the first function relates a flow rate which can be delivered by the pump with a speed of rotation of the pump;

preparing a second function for each of the flow rate control valves, the second function relates a flow rate which can be delivered by the respective flow rate control valve with a level of the respective control signal;

at a given instant in time:

detecting a presence of one or more of the control signals and a level of each of the detected control signals;

using the second function, calculating the flow rate which can be delivered by each of the respective flow rate control valves as a function of the level of the respective control signal;

calculating a total required flow rate, as a sum of the flow rates which can be delivered by each of the flow rate control valves;

using the first function, calculating a required rotation speed of the pump;

adjusting the rotation speed of the motor as a function of the required rotation speed of the pump.

2. The method according to claim 1, wherein the step of preparing said second function comprises, for each of the flow rate control valves, an experimental measurement of the flow rate which can be delivered at predetermined open positions, and an interpolation, using a predetermined mathematical method, of the flow rate which can be delivered in the predetermined open positions.

3. The method according to claim 1, wherein the step of preparing said first function comprises a step of measuring an actual flow rate which can be delivered by the pump at one or more predetermined pressure values at delivery and one or more predetermined rotation speeds, and an interpolation, using a predetermined mathematical method, of the actual flow rates measured.

4. The method according to claim 1, wherein said control signals for the control valves are electrical signals, and wherein the level of each of the control signals is the intensity of an electric current.

5. The method according to claim 4, wherein the level of each of the control signals can be adjusted by a control device operated by an operator.

6. The method according to claim 1, comprising a step of assigning a priority index to each of the flow rate control valves and, if the total required flow rate is greater than the flow rate which can be delivered by the pump, modifying the level of the control signal of each of the control valves as a function of the respective priority index, to reduce the flow rate which can be delivered of one or more of the control valves.

7. The method according to claim 1, wherein: the motor, the pump and the actuators are associated with an operator vehicle;

wherein there are the following steps:

detecting one or more of the following operating conditions: presence of an operator on board; use of one or more commands for the actuators; state of travel or stopping of the vehicle; and increasing the rotation speed of the motor in a presence of at least one of the operating conditions.

8. An operator vehicle, comprising:

a motor;

a pump, connected to the motor;

one or more hydraulic actuators, connected to the pump;

wherein at least one electrically activated flow rate control valve is interposed between the pump and each of the one or more hydraulic actuators;

a control device configured for sending an adjustable level control signal to each of the flow rate control valves;

a control module connected to the control device, to the control valves and to the motor; wherein the control module is configured with a first function, the first function relates a flow rate which can be delivered by the pump with a rotation speed of the pump, and with a second function for each of the flow rate control valves, the second function relates a flow rate which can be delivered by the respective flow rate control valve with a level of the respective control signal;

the control module is configured to perform a control algorithm which, at a predetermined instant, performs the following steps:

detecting a presence of one or more of the control signals and a level of each of the detected control signals;

using the second function, calculating the flow rate which can be delivered by each of the respective flow rate control valves as a function of the level of the respective control signal;

calculating a total required flow rate, as a sum of the flow rates which can be delivered by each of the flow rate control valves;

using the first function, calculating a required rotation speed of the pump, wherein the required rotation speed is minimum necessary rotation speed to deliver the total required flow rate;

adjusting the rotation speed of the motor as a function of the required rotation speed of the pump.

9. The operator vehicle according to claim 8, wherein the control algorithm is configured for detecting one or more of the following operating conditions: presence of an operator on board; use of one or more commands for the actuators; state of travel or stopping of the vehicle; and in the presence of at least one of the operating conditions, the control algorithm is configured to increase the rotation speed of the motor.

* * * * *